(12) United States Patent
Ayar et al.

(10) Patent No.: US 12,292,051 B2
(45) Date of Patent: May 6, 2025

(54) DEVICE FOR CONTROLLING A FLUID MASS FLOW FOR A DEVICE FOR COMPRESSING A GASEOUS FLUID AND DEVICE FOR COMPRESSING A GASEOUS FLUID

(71) Applicant: Hanon Systems, Daejeon (KR)

(72) Inventors: Ayhan Ayar, Cologne (DE); Gerd Vondahlen, Gangelt (DE); Marcel Stober, Cologne (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/748,321

(22) Filed: Jun. 20, 2024

(65) Prior Publication Data
US 2024/0426301 A1 Dec. 26, 2024

(30) Foreign Application Priority Data

Jun. 20, 2023 (DE) .................... 10 2023 116 123.7
Apr. 10, 2024 (DE) .................... 10 2024 109 919.4

(51) Int. Cl.
*F04C 28/12* (2006.01)
*F04C 18/02* (2006.01)
(Continued)

(52) U.S. Cl.
CPC .......... *F04C 28/24* (2013.01); *F04C 18/0215* (2013.01); *F04C 28/12* (2013.01);
(Continued)

(58) Field of Classification Search
CPC ...... F04C 28/24; F04C 18/0215; F04C 28/12; G05D 7/0126; F16K 15/025
See application file for complete search history.

(56) References Cited

U.S. PATENT DOCUMENTS

2010/0158710 A1 6/2010 Satoshi et al.
2016/0291611 A1* 10/2016 Burgett ................ G05D 7/0126

FOREIGN PATENT DOCUMENTS

DE 102016105302 A1 9/2017
DE 102016105302 B4 6/2018
(Continued)

OTHER PUBLICATIONS

English WO 2017073213 by PE2E Oct. 3, 2024.*
English WO 9609484 by PE2E Oct. 3, 2024.*

*Primary Examiner* — Deming Wan
(74) *Attorney, Agent, or Firm* — Shumaker, Loop & Kendrick, LLP; James D. Miller

(57) ABSTRACT

A device for controlling a fluid mass flow for a device for compressing a gaseous fluid from a low to a high pressure level. The device has a housing with fluid connections at different pressure levels, and a closure element arranged to move in a translatory manner within the housing along a longitudinal axis, with effective surfaces assigned to the fluid connections. The closure element regulates a flow cross-section of a flow path extending between a first and a second fluid connection. The device has a receiving element for receiving the closure element. A primary segment is arranged to be completely surrounded by the receiving element as a first section of the closure element and a secondary segment is arranged to be completely surrounded by the housing as a second section of the closure element and the receiving element is arranged to be completely surrounded by the housing.

16 Claims, 4 Drawing Sheets

(51) Int. Cl.
*F04C 28/24* (2006.01)
*F16K 15/02* (2006.01)
*G05D 7/01* (2006.01)

(52) U.S. Cl.
CPC ......... F16K 15/025 (2013.01); G05D 7/0126 (2013.01); *F04C 2270/585* (2013.01)

(56) References Cited

FOREIGN PATENT DOCUMENTS

| DE | 102021122949 A1 | | 3/2023 | | |
| --- | --- | --- | --- | --- | --- |
| WO | WO-9609484 A1 | * | 3/1996 | ......... | F24D 19/1015 |
| WO | WO-2017073213 A1 | * | 5/2017 | .......... | F04C 15/0092 |

* cited by examiner

DEVICE FOR CONTROLLING A FLUID MASS FLOW FOR A DEVICE FOR COMPRESSING A GASEOUS FLUID AND DEVICE FOR COMPRESSING A GASEOUS FLUID

CROSS-REFERENCE TO RELATED APPLICATIONS

The present application claims the benefit of and priority to German Patent Application No. 10 2024 109 919.4, filed Apr. 10, 2024 and German Patent Application No. 10 2023 116 123.7, filed Jun. 20, 2023, the entire contents of each of which are incorporated herein for all purposes by reference.

FIELD

The invention relates to a device for controlling a fluid mass flow as a control flow for a device for compressing a gaseous fluid, in particular a control valve for a scroll compressor. The device for controlling the control mass flow has a housing with fluid connections impinged upon at different pressure levels and a closure element which can be moved in a translatory manner within the housing along a longitudinal axis, with effective surfaces assigned to the fluid connections. The closure element is formed such as to regulate a flow cross-section of a flow path extending between a first fluid connection and a second fluid connection.

The invention also relates to a device for compressing a gaseous fluid, in particular a scroll compressor for compressing a refrigerant, which has a housing with a counter wall and a compression mechanism with an immobile, fixed spiral and a movable, orbiting spiral driven via an eccentric drive. The scroll compressor is also referred to as a spiral compressor.

BACKGROUND

Compressors for mobile applications known from the prior art, in particular for air-conditioning systems of motor vehicles, for conveying refrigerant through a refrigerant circuit, also referred to as refrigerant compressors, are often formed as piston compressors with variable displacement or as scroll compressors irrespective of the refrigerant. The compressors are driven either via a pulley or electrically.

In addition to a housing, conventional scroll compressors have an immobile, fixed spiral with a disc-shaped base plate and a spiral-shaped wall extending from one side of the base plate as well as a movable orbiting spiral also with a disc-shaped base plate and a spiral-shaped wall extending from a front side of the base plate. The base plates are arranged relative to one another such that the spiral-shaped walls engage with one another in the axial direction.

The fixed spiral and the orbiting spiral work together. The orbiting spiral is moved on a circular path by means of an eccentric drive such that the spiral-shaped walls touch at several points and several successive, sealed working spaces are formed between the walls and the base plates. The volumes of adjacent working spaces vary in size. As a result of the movement of the orbiting spiral relative to the fixed spiral, the volumes and the positions of the working spaces are changed such that the volumes of the working spaces become progressively smaller towards the centre of the spiral-shaped walls and a gaseous fluid enclosed within the working spaces is compressed. The fluid compressed in this way is discharged from the compression mechanism through at least one outlet. The associated increase in pressure in adjacently arranged working spaces causes a force acting on the orbiting spiral, predominantly in the axial direction, which also acts eccentrically on the orbiting spiral and thus generates a tilting moment.

In addition, gaps formed in the axial direction between the fixed spiral and the orbiting spiral should be minimal for sufficient internal tightness, which is also guaranteed in connection with pressing the orbiting spiral against the fixed spiral.

The scroll compressors belonging to the prior art have a wall which is arranged within the housing and firmly connected to the housing and which is formed as a boundary of a counter pressure area and is consequently also referred to as a counter wall. Due to the counterpressure prevailing within the counter-pressure region formed between the counter wall and the orbiting spiral, in particular a rear side of the base plate of the orbiting spiral, also referred to as counter pressure chamber, the orbiting spiral is pressed against the fixed spiral, which is fixed on the housing like the counter wall, through a force acting in the axial direction. The pressure force acting in the axial direction is regulated by the counter pressure present within the counter pressure region, also referred to as a contact pressure. As such, as an intermediate pressure or medium pressure, the contact pressure level is between the levels of the high pressure as the outlet pressure and the low pressure as the suction pressure of the compressor. The value of the contact pressure is to be adjusted such that, on the one hand, the axial sealing surfaces between the orbiting spiral and the fixed spiral are closed and, on the other hand, excessive friction causing wear between the fixed spiral and the orbiting spiral is avoided.

The regions of the compressor which are acted upon by high pressure and counter pressure as well as by counter pressure and low pressure can in each case be connected to one another via flow channels with integrated expansion devices. A very limited mass flow of the fluid compressed in the compressor or of a mixture of the fluid and oil as lubricant of the compressor, which is also referred to as control mass flow, flows through the flow channels. Conventional expansion devices are in each case formed as nozzles. At least one expansion device can also be formed as a spring-loaded mechanical regulating valve.

DE 10 2016 105 302 A1 discloses a control flow regulating valve for spiral compressors in air-conditioning systems for motor vehicles. The control flow regulating valve has a housing and a closure element arranged inside the housing for adjusting the control flow. The housing is formed with fluid connections for the high pressure, the counter pressure and the suction pressure as well as the ambient pressure. The closure element for the control flow has effective surfaces associated with the respective fluid connections. A force resulting from the pressures applied to the closure element acts on the closure element such that a control flow generating a counter pressure flows from a region to which fluid is applied to high pressure to a region to which fluid is applied to suction pressure. In addition, a fluid-tight region, to which ambient pressure is applied, is formed and is sealed by means of a sheet metal membrane welded to the metallic closure element or vulcanised membrane. A spring element for generating an additional force acting on the closure element is also arranged inside the housing.

The equilibrium of forces on the closure element and the position of the closure element for achieving a required control curve of the counter pressure as a function of the high pressure and the suction pressure or low pressure is influenced by the pressures on the effective surfaces and by the flow through a passage opening released by the closure element.

The control flow regulating valve has two elastomer membranes which are formed on the low pressure side and the counter pressure side. The elasticity of the elastomer membrane permits axial mobility of the closure element within the housing. The elastomer membranes delimit a region of the control flow regulating valve in the axial direction which, due to a connection to the ambient pressure, has an atmospheric pressure independent of the low pressure and the counter pressure. A fluid-tight and pressure-tight barrier is formed with the elastomer membranes between the low pressure side and the counter pressure side. The fluid-tight connection of the elastomer membranes is guaranteed by vulcanisation to the surrounding housing or the closure element.

The devices known from the prior art for controlling a fluid mass flow as a control flow, in particular for a device for compressing a gaseous fluid, have a large number of components which are connected to one another in a complex structure, which causes a high complexity during assembly with a high number of assembly steps and thus high assembly costs. Thus, for example, several seals are required in order to separate different pressure stages from one another. In addition, the large number of components carries a high risk of errors during the assembly process. Furthermore, vulcanising the membrane of an elastomer on metal, for example, is very complicated and complex and is unsuitable in particular for high pressure applications, such as in systems for carbon dioxide as a fluid. Sealing with vulcanised membranes also causes a high permeation surface, which can lead to a very high discharge of the fluid into the environment and thus to a very high loss of the fluid over a total operating time.

In order to adjust the device, especially the closure element, to the corresponding operating point and to achieve a high reproducibility, the sealing seat must be embossed. In this case, a defined force is applied to the closure element during embossing by means of a press, so that a corresponding sealing seat is formed on the housing by plastic deformation of the material. The embossing process usually consists of an iteration of embossing steps and testing until a desired pressure level is adjusted and serves, for example according to DE 10 2016 105 302 A1, for adjusting a distance between the closure element and the elastomer membranes in order to eliminate stresses of the elastomer membranes which occur as a result of extension.

SUMMARY

The object of the invention is to provide a device for controlling a fluid mass flow as a control flow for a device for compressing a gaseous fluid, in particular in order to guarantee trouble-free operation with maximum service life of the device for compressing the fluid. The device should have a minimum number of individual components and be structurally simple to realise, also in order to minimise the assembly effort and costs during assembly. The device is to be formed in a fluid-tight manner in order to prevent leakage or the escape of fluid into the environment and thus the loss of fluid from a system.

The object is achieved by the subject matters having the features shown and described herein.

The object is achieved by a device according to the invention for controlling a fluid mass flow as a control flow for a device for compressing a gaseous fluid from a low pressure level to a high pressure level. The device for controlling a fluid mass flow has a housing with fluid connections impinged upon at different pressure levels and a closure element which can be moved in a translatory manner within the housing along a longitudinal axis, with effective surfaces assigned to the fluid connections. The closure element is formed such as to regulate a flow cross-section of a flow path extending between a first fluid connection and a second fluid connection.

According to the concept of the invention, the device has a receiving element for receiving the closure element. A primary segment is completely surrounded by the receiving element as a first section of the closure element, and a secondary segment is completely surrounded by the housing as a second section of the closure element. In addition, the receiving element is completely surrounded by the housing. The secondary segment of the closure element is sealed to the housing via at least one first sealing element and the primary segment of the closure element is sealed to the receiving element via at least one second sealing element and the receiving element is sealed to the housing via at least one third sealing element, respectively in a fluid-tight and pressure-tight manner.

The closure element is advantageously formed integrally with the primary segment and the secondary segment as a coherent unit. The closure element and the receiving element can each be a metallic or a non-metallic component. The sealing elements are preferably in each case formed as an O-ring seal.

According to a further development of the invention, the first fluid connection of the housing is acted upon by the fluid at a counter pressure level and the second fluid connection of the housing is acted upon by the fluid at the high pressure level, while a third fluid connection of the housing is acted upon by the fluid at the low pressure level. The counter pressure level represents an intermediate pressure level between the low pressure level and the high pressure level of the fluid. A fourth fluid connection of the housing is preferably acted upon by a level of the ambient pressure, in particular the ambient air.

According to a preferred design of the invention, the closure element is formed to be cylindrical, in particular circular cylindrical, with sections of different outer diameters, so that the closure element has steps between adjacent sections.

An advantage of the invention is that the closure element forms a sealing seat with the receiving element on a first end face, in particular an end face of the primary segment.

A volume which is limited by the housing and a second end face of the closure element, in particular an end face of the secondary segment, which is distal to the first end face, is preferably acted upon by the ambient pressure level, in particular by ambient air, and is connected to the environment via the fourth fluid connection of the housing.

According to an advantageous design of the invention, the primary segment of the closure element is formed with a primary segment diameter and the secondary segment of the closure element is formed with at least two sections each having different outer diameters. The primary segment diameter and the outer diameters of the secondary segment of the closure element can also differ from one another.

According to a further preferred design of the invention, a volume, which is limited by the housing, the receiving element and the closure element with an annular effective surface with a first outer diameter of the closure element and the primary segment diameter of the closure element as an inner diameter, is acted upon by the fluid at the low pressure level and is connected to the third fluid connection of the housing.

In addition, a volume, which is limited by the housing and the closure element with an annular effective surface with the first outer diameter of the closure element and a second outer diameter of the closure element as an inner diameter, is advantageously acted upon by the fluid at the counter pressure level and is connected to the first fluid connection of the housing.

According to a further development of the invention, a first fluid connection is formed inside the housing, which extends from the first fluid connection to the volume limited by the housing and the closure element with the annular effective surface with the first outer diameter of the closure element and the second outer diameter of the closure element as the inner diameter.

Within the housing, a second fluid connection can also be provided which extends from the first fluid connection to the volume limited by the housing and the closure element with the annular effective surface with the first outer diameter of the closure element and the primary segment diameter of the closure element as an inner diameter or to the third fluid connection of the housing. The second fluid connection is advantageously formed with an expansion element, in particular a throttle member.

The device for controlling the fluid mass flow as a control flow is advantageously configured such that the translatory movement of the closure element within the housing and the receiving element is based exclusively on pressures acting on the effective surfaces of the closure element and thus on pressure forces. The defined pressure forces or piston forces cause the movement of the closure element within sliding sealing elements, in particular formed as O-rings.

The object is also achieved by a device according to the invention for compressing a gaseous fluid from a low pressure level to a high pressure level, in particular a scroll compressor for compressing a refrigerant. The fluid to be compressed is present in an intake region at the low pressure level and the compressed fluid is present in a high pressure region, especially at an outlet of the device for compressing, at the high pressure level. The device for compressing has a housing with a counter wall and a compression mechanism with an immobile, fixed spiral and a movable, orbiting spiral driven via an eccentric drive. The housing with the counter wall and the orbiting spiral at least partially surround a counter pressure chamber together. In addition, a flow path extending from the high pressure region to the counter pressure chamber is formed.

According to the concept of the invention, a device according to the invention for controlling a fluid mass flow is formed within the flow path extending between the high pressure region and the counter pressure chamber.

The advantageous design of the invention allows for the use of the device for compressing the gaseous fluid with the device for controlling a fluid mass flow as a compressor in a refrigerant circuit of an air-conditioning system of a motor vehicle. The compressor can be formed to be driven electrically or mechanically. In this case, the compression mechanism is driven by means of an electric motor or a pulley.

The device according to the invention for controlling a fluid mass flow as a control flow for a device for compressing a gaseous fluid from a low pressure level to a high pressure level can consequently be formed as a control flow regulating valve, in particular of a scroll compressor of a refrigerant circuit of an air-conditioning system of a motor vehicle.

The device according to the invention for controlling a fluid mass flow and the device for compressing a gaseous fluid with the device according to the invention for controlling a fluid mass flow together have further diverse advantages:

- minimum number of individual components and simple construction, thus minimal assembly effort, manufacturing effort and maintenance effort as well as minimal assembly costs, manufacturing costs and maintenance costs,
- for example, the spring element provided in the device in comparison with the prior art is not required and the sealing seat is integrated into the receiving element without an additional shaping step, and
- maximum operational safety and tightness due to a minimum number of potential leakage paths to the environment—there is only one sealing point to the environment, thus minimum release of refrigerant from the device for compressing.

BRIEF DESCRIPTION OF THE DRAWINGS

Further details, features and advantages of the invention will become apparent from the following description of an exemplary embodiment with reference to the accompanying drawings. In the drawings.

DETAILED DESCRIPTION

Figure 1:
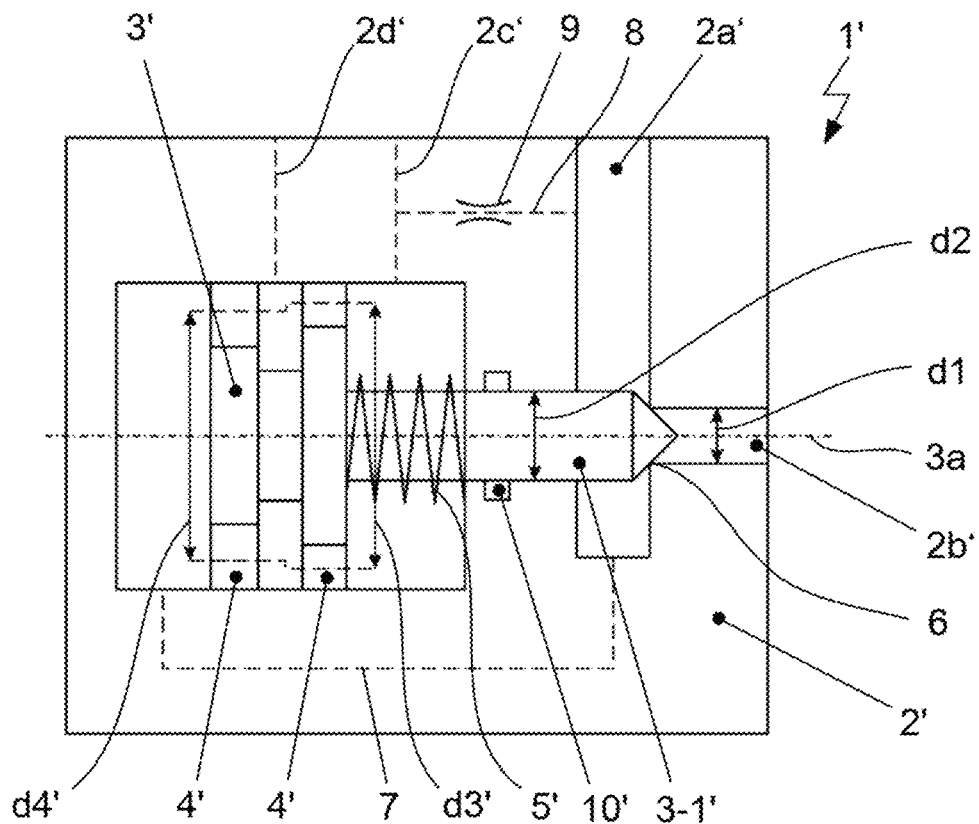
FIG. 1: a basic circuit diagram of a device for controlling a fluid mass flow as a control flow for a device for compressing a gaseous fluid with a radial ambient pressure application from the prior art.

FIG. 1 reveals a basic circuit diagram of a device F for controlling a fluid mass flow as a control flow, also referred to as a control flow regulating valve, for a device for compressing a gaseous fluid from a suction pressure level to a high pressure level with a radial ambient pressure application from the prior art.

The device F has a housing 2' with different fluid connections 2a', 2b', 2c', 2d'. Within the housing 2', a closure element 3' is arranged so as to be movable in a translatory manner along a longitudinal axis 3a which corresponds to a symmetry axis of the closure element 3'. The device 1' is formed with a flow path which extends from a first fluid connection 2a' to a second fluid connection 2b' and whose flow cross-section can be regulated by means of the closure element 3'. A control flow of the fluid is regulated by means of the closure element 3' from a level of the high pressure at the second fluid connection 2b' to a counter pressure level at the first fluid connection 2a'.

In addition, the housing 2' has a third fluid connection 2c' with the fluid at a level of the suction pressure of the device for compressing the fluid, also referred to as a level of the low pressure, and a fourth fluid connection 2d' with a level of the ambient pressure. The third fluid connection 2c' and the fourth fluid connection 2d' each form no flow path. The third fluid connection 2c' and the fourth fluid connection 2d' serve to transmit the levels of the suction pressure and the ambient pressure to corresponding effective surfaces of the closure element 3'.

Between the closure element 3' and the housing 2', membrane sealing elements 4' are arranged which delimit a region of the device 1' in the direction of the longitudinal axis 3a and seal the device 1' to the ambient pressure. The region delimited by the membrane sealing elements 4' has an atmospheric pressure independent of the low pressure and the counter pressure due to a connection to the ambient pressure level. The membrane sealing elements 4' form in combination a fluid-tight and pressure-tight barrier between the low pressure side connected to the third fluid connection 2c' and the counter pressure side connected to the first fluid connection 2a'.

Due to the membrane sealing elements 4' formed between the closure element 3' and the housing 2' in each case as a welded sheet metal membrane or a vulcanised membrane, there is a high risk of leakage and thus the risk of fluid flowing out into the environment via the fourth fluid connection 2d'. The device 1' has four potential leakage paths for the fluid into the environment. The membrane sealing elements 4', each formed from an elastomer, are vulcanised onto the closure element 3'.

In a closed position of the device 1' shown in FIG. 1, the closure element 3' rests against a sealing seat 6 formed on the housing 2' with a sealing seat diameter d1. The sealing seat 6 is formed between the first fluid connection 2a' and the second fluid connection 2b'. The flow path extending between the fluid connections 2a', 2b' is closed. In the case of a position of the device 1' deviating from the closed position, the fluid flows from the second fluid connection 2b' to the first fluid connection 2a' through the flow path. A flow resistance is generated with the regulated, narrow sealing seat 6, which causes a pressure loss of the fluid.

The device 1' also has a spring element 5' which is arranged to act on the closure element 3' with a spring force aligned counter to the closed position of the closure element 3'. The spring element 5' is consequently formed for opening the device 1', in particular the flow path extending between the first fluid connection 2a' and the second fluid connection 2b', when the forces acting on the closure element 3' due to the different pressures are balanced.

The closure element 3' bears with a free end face of a primary segment 3-1' orientated in the direction of the longitudinal axis 3a against the sealing seat 6 in a manner closing the flow path extending between the first fluid connection 2a' and the second fluid connection 2b'. The primary segment 3 1' of the closure element 3' cooperates with the sealing seat 6 and the second fluid connection 2b'.

The closure element 3' is geometrically formed such that a primary segment diameter d2, the sealing seat diameter d1, a first effective diameter d3' of the suction pressure level to the ambient pressure level and a second effective diameter d4' of the counter pressure level to the ambient pressure level are configured such that a resulting force acts on the closure element 3' as a function of the respectively applied pressure levels and thus controls the control flow of the fluid from the second fluid connection 2b' to the first fluid connection 2a'. By means of a force balance, the closure element 3' is brought into the corresponding position in each case.

The device 1' is also formed with a first fluid connection 7 which extends from the first fluid connection 2a' to a volume enclosed by the closure element 3', in particular an effective surface with the second effective diameter d4' of the counter pressure level to the ambient pressure level, and the housing 2', in order to include the counter pressure level correspondingly in the force balance at the closure element 3'. In addition, a second fluid connection 8 is provided which connects the first fluid connection 2a' to the third fluid connection 2c' and extends between the first fluid connection 2a' and a volume enclosed by the closure element 3', in particular an effective surface with the first effective diameter d3' of the suction pressure level to the ambient pressure level, and the housing 2'. An expansion element 9, especially a throttle element or a throttle, is arranged within the second fluid connection 8.

The primary segment 3-1' of the closure element 3' is sealed off from the housing 2' by means of a sealing element 10' formed as an O-ring.

Figure 2:
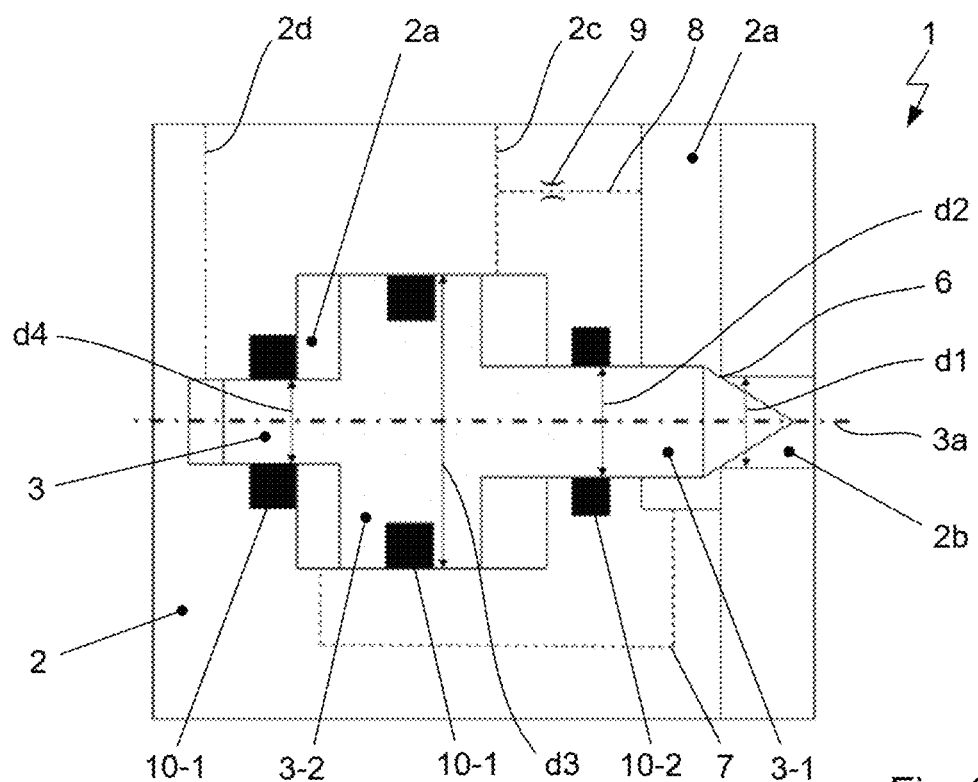
FIGS. 2 and 3: each a basic circuit diagram of a device according to the invention for controlling a fluid mass flow as a control flow for a device for compressing a gaseous fluid.
Figure 3:
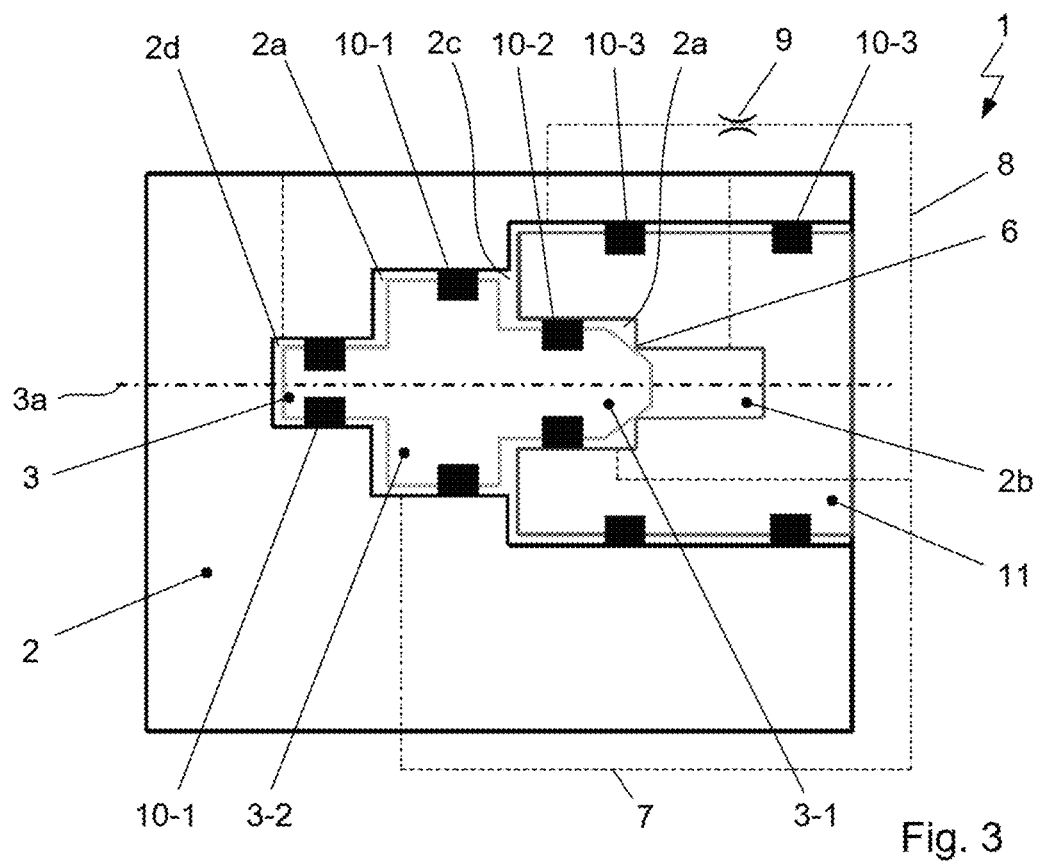
Figure 4:
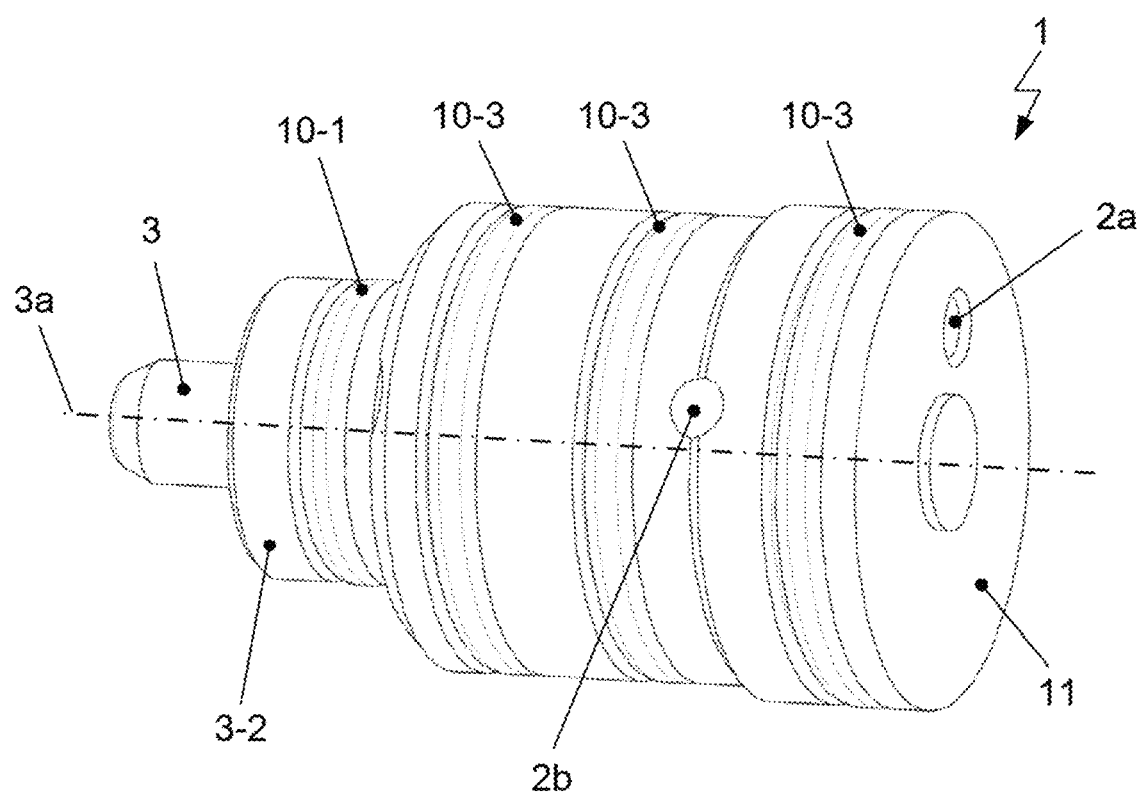
FIG. 4: the device according to the invention with a closure element and a receiving element in a perspective representation.
Figure 5:
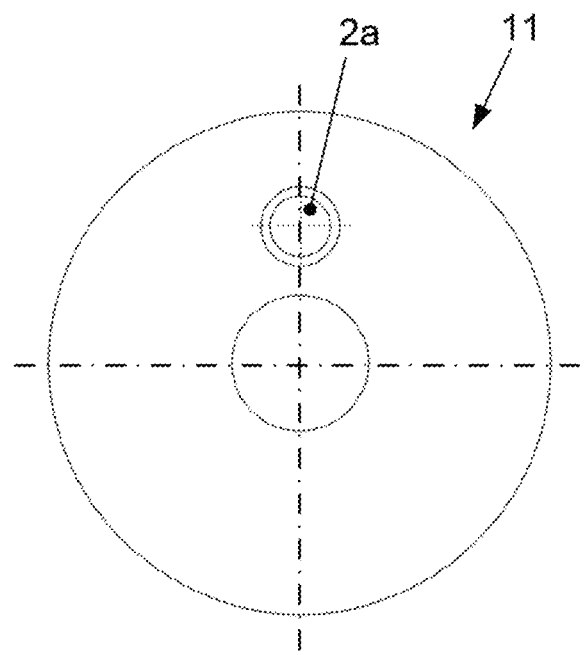
FIG. 5: the device of FIG. 4 in a top view.

In FIGS. 2 and 3, a basic circuit diagram of a device 1 according to the invention for controlling a fluid mass flow as a control flow for a device for compressing a gaseous fluid from the suction pressure level to the high pressure level is shown with an axial ambient pressure application on one end face of a piston-shaped closure element 3 within a housing 2, while the device 1 according to the invention is shown in FIG. 4 with the closure element 3 and a receiving element 11 in a perspective representation and in FIG. 5 in a plan view of the receiving element 11 in each case without the housing 2. The components which are identical in comparison to the device 1 of the prior art represented in FIG. 1 are each provided with the same reference numerals.

The device F has the housing 2' with different fluid connections 2a', 2b', 2c', 2d'. The fluid connections 2a, 2b, 2c, 2d are also to be understood as meaning flow channels formed in the components of the device 1. The closure element 3 and the receiving element 11, not represented in FIG. 2, for the closure element 3 are integrated within the housing 2.

The closure element 3, which is arranged in each case in regions within the housing 2 and the receiving element 11, can be moved in a translatory manner along the longitudinal axis 3a as the axis of symmetry of the closure element 3. The closure element 3 is formed to be guided with a primary segment 3-1 within the receiving element 11 and with a secondary segment 3-2 within the housing 2. The closure element 3 with the primary segment 3-1 is arranged inside the receiving element 11 and the receiving element 11 is arranged inside the housing 2, while the closure element 3 with the secondary segment 3-2 is arranged inside the housing 2.

The closure element 3 is formed integrally with the primary segment 3-1 and the secondary segment 3-2 in the form of a cylinder, in particular a circular cylinder, with sections of different outer diameters.

The device 1 has the flow path extending between the first fluid connection 2a at the counter pressure level and the second fluid connection 2b at the high pressure level of the device for compressing the gaseous fluid, the flow cross-section of which can be regulated with the movement of the closure element 3. The control flow of the fluid is regulated with the closure element 3.

According to FIGS. 2 and 3, the free first end face of the closure element 3 orientated in the direction of the longitudinal axis 3a bears against a sealing seat 6 in a manner closing the flow path extending between the first fluid connection 2a and the second fluid connection 2b. The sealing seat 6 is formed in the receiving element 11 of the device 1. The closure element 3 cooperates with the sealing seat 6 and the second fluid connection 2b.

The housing 2 also has the third fluid connection 2c with the fluid at the level of the suction pressure or the low pressure of the device for compressing the fluid and the fourth fluid connection 2d with the level of the ambient pressure. The third fluid connection 2c' and the fourth fluid connection 2d' only serve to transmit the levels of the suction pressure and the ambient pressure to corresponding effective surfaces of the closure element 3'.

Two first sealing elements 10-1 are arranged between the closure element 3 and the housing 2, a second sealing element 10-2 is arranged between the closure element 3 and the receiving element 11, and third sealing elements 10-3 are arranged between the receiving element 11 and the housing 2, each of which delimit and seal relative to one another volumes of the device 1 which are subjected to different pressures in the direction of the longitudinal axis 3a.

The piston-shaped closure element 3 is subjected to ambient pressure on a second end face distal to the first end face aligned with the sealing seat 6. A volume delimited by the housing 2 and the second end face of the closure element 3 is acted upon by the ambient pressure level. The volume connected to the environment via the fourth fluid connection 2d thus has a pressure level which is independent of the low pressure level and the counter pressure level.

In the closed position of the device 1 represented in FIGS. 2 and 3, the closure element 3 in each case rests against the sealing seat 6 formed on the receiving element 11 with the sealing seat diameter d1. The flow path extending between the first fluid connection 2a and the second fluid connection 2b is closed.

The closure element 3 is geometrically formed such that the primary segment diameter d2, the sealing seat diameter d1, a first outer diameter d3 of the suction pressure level to the counter pressure level and a second outer diameter d4 of the counter pressure level to the ambient pressure level are configured such that a resulting force acts on the closure element 3 as a function of the respectively applied pressures and thus controls the control flow of the fluid from the second fluid connection 2b to the first fluid connection 2a. By means of a force balance, the closure element Y is brought into the corresponding position in each case. The primary segment diameter d2 and the outer diameters d3, d4 of the closure element 3 are each configured such that the counter pressure level which is established in particular satisfies the required pressure of an orbiting spiral on a fixed spiral of a compression mechanism of a scroll compressor as a device for compressing a gaseous fluid.

According to FIGS. 2 and 3, the device 1 is also formed with the first fluid connection 7 which extends from the first fluid connection 2a to a volume enclosed by the closure element 3, in particular an effective surface with the first outer diameter d3 of the counter pressure level to the suction pressure level, and the housing 2, in order to include the counter pressure level correspondingly in the force balance at the closure element 3. In addition, the second fluid connection 8 is provided which connects the first fluid connection 2a to the third fluid connection 2c and extends between the first fluid connection 2a and a volume enclosed by the closure element 3, in particular an effective surface with the first effective diameter d3 of the suction pressure level to the counter pressure level, and the housing 2. The expansion element 9 is arranged within the second fluid connection 8.

The volume enclosed by the closure element 3, in particular the second end face with the effective surface with the second outer diameter d4 and the housing 2 and connected to the fourth fluid connection 2d and thus acted upon with the ambient pressure level serves to reduce the effective surface of the counter pressure acting in the closed position of the closure element 3.

On the first end face of the closure element 3, the high pressure level prevailing in the second fluid connection 2b and the reduced counter pressure level prevailing at the sealing seat 6 by means of the sealing gap formed between the closure element 3 and the receiving element 11 also act counter to the closed position of the closure element 3.

The first sealing elements 10-1, which are formed as O-rings, each form a fluid-tight and pressure-tight barrier between the volumes impinged upon by the ambient pressure level and the counter pressure level and between the volumes impinged upon by the counter pressure level and the suction pressure level, while the second sealing element 10-2, which is formed as an O-ring, forms a fluid-tight and pressure-tight barrier between the volume impinged upon by the suction pressure level and the first fluid connection 2a. Thus, only the first sealing element 10-1 provided between the volumes impinged upon by the ambient pressure level and the counter pressure level is formed as a sealing of the device 1 to the environment.

Figure 6:
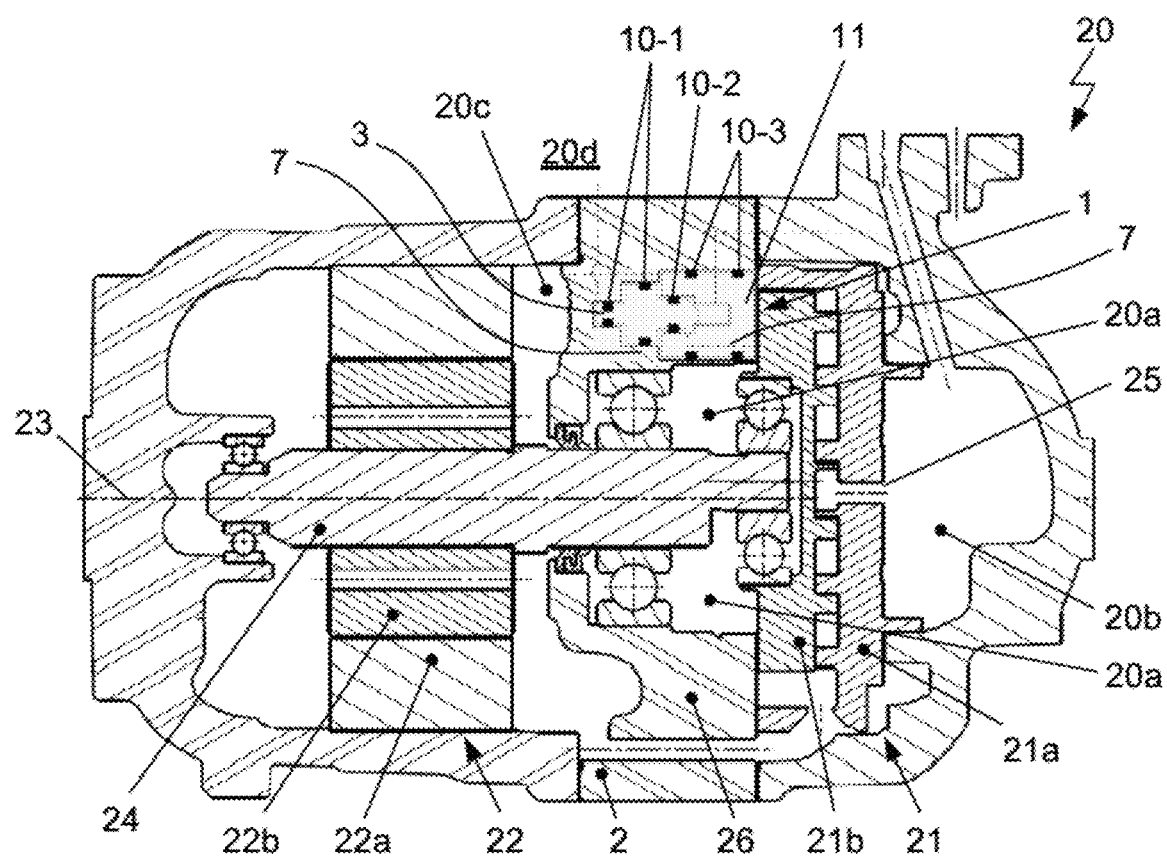
FIG. 6: a device for compressing a gaseous fluid with an integrated device for controlling a fluid mass flow as a control flow in a lateral sectional representation.

In FIG. 6, a device for compressing a gaseous fluid, in particular an electrically driven compressor 20, especially a scroll compressor, is shown with an integrated device 1 for controlling a fluid mass flow as a control flow in a lateral sectional representation. The compressor 20 is formed with a compression mechanism 21 and an electric motor 22 for driving the compression mechanism 21.

The compression mechanism 21, which is formed with a fixed spiral 21a and an orbiting spiral 21b, and the electric motor 22 are arranged within a volume enclosed by the housing 2.

The housing 2 is formed of housing elements, in particular for receiving the compression mechanism 21 and for receiving the electric motor 22, and preferably of a metal, for example of an aluminium.

The electric motor 22 has a stator 22a with an essentially hollow cylindrical stator core and coils wound on the stator core, and a rotor 22b arranged inside the stator 22a. The rotor 22b is set into a rotational movement when electrical energy is supplied to the coils of the stator 22a. The rotor 22b is arranged coaxially within the stator 22a and rotatable about an axis of rotation 23. A drive shaft 24 can be formed integrally with the rotor 22b or as a separate element.

The orbiting spiral 21b of the compression mechanism 21, in which the gaseous fluid, especially a refrigerant, is compressed, is driven via the drive shaft 24 connected to the rotor 22b of the electric motor 22. The fluid compressed to the high pressure level when flowing through the compression mechanism 21 is discharged through at least one outlet 25 from the compression mechanism 21 into a region of the high pressure level 20b of the compressor 20.

The compressor 20 also has a wall arranged within the housing 2 and fixedly connected to the housing 2, which is formed as a boundary of a region of the counter pressure level 20a of the compressor 20, also known as the counter pressure region, and is consequently also referred to as a counter wall 26. Within the region of the counter pressure level 20a formed between the counter wall 26 and the orbiting spiral 21b, in particular a rear side of a base plate of the orbiting spiral 21b, the fluid is present at the counter pressure level, which is also present as a level of the contact pressure as an intermediate pressure between the levels of the high pressure as outlet pressure and of the low pressure as suction pressure of the compressor 20. The fluid has the low pressure level in a region of the low pressure level 20c of the compressor 20, in which the electric motor 22 is also arranged. Outside the housing 2 of the compressor 20, the ambient pressure prevails, so that the environment is also designated as a region of the ambient pressure level 20d of the compressor 20.

The device 1 for controlling a fluid mass flow is preferably integrated within a cavity of the housing 2 of the device for compressing a gaseous fluid, in particular of the compressor 20. The first sealing elements 10-1 are arranged between the closure element 3 and the housing 2, and the second sealing element 10-2 is arranged between the closure element 3 and the receiving element 11, while pressure chambers formed between the receiving element 11 and the housing 2 are sealed relative to one another by the third sealing elements 10-3 formed as O-rings. The receiving element 11 of the closure element 3 of the device 1 is sealed to the housing 2 via the third sealing elements 10-3. The third sealing elements 10-3 each form a fluid-tight and pressure-tight barrier between volumes impinged upon by the suction pressure level and the high pressure level, in particular between the region of the low pressure level 20c and the region of the high pressure level 20b of the compressor 20, and between volumes impinged upon by the high pressure level and the counter pressure level, in particular between the region of the high pressure level 20b and the region of the counter pressure level 20a of the compressor 20. The regions of the counter pressure level 20a are connected to one another via the first fluid connection 7.

LIST OF REFERENCE NUMERALS 1, 1' device
2, 2' housing
2a, 2a' first fluid connection at counter pressure level
2b, 2b' second fluid connection at high pressure level
2c, 2c' third fluid connection at low pressure/suction pressure level
2d, 2d' fourth fluid connection at ambient pressure level
3, 3' closure element
3a longitudinal axis
3-1, 3-1' primary segment of closure element 3, 3'
3-2 secondary segment of closure element 3
4' membrane sealing element
5' spring element
6 sealing seat
7 first fluid connection
8 second fluid connection
9 expansion element
10-1 first sealing element
10-2 second sealing element
10-3 third sealing element
10' sealing element
11 receiving element
20 compressor
20a region of counter pressure level
20b region of high pressure level
20c region of low pressure/section pressure level
20d region of ambient pressure level
21 compression mechanism
21a fixed spiral
21b orbiting spiral
22 electric motor
22a stator
22b rotor
23 rotation axis
24 drive shaft
25 outlet
26 counter wall
d1 sealing seat diameter
d2 primary segment diameter
d3 first outer diameter
d3' first effective diameter
d4 second outer diameter
d4' second effective diameter

What is claimed is:

1. A controlling device for controlling a fluid mass flow for a compressing device for compressing a gaseous fluid from a low pressure level to a high pressure level, the controlling device comprising:
a housing with a plurality of fluid connections acted upon at different pressure levels and a closure element which is arranged such that it can be moved in a translatory manner within the housing along a longitudinal axis, with effective surfaces assigned to the fluid connections, wherein the closure element is formed such as to regulate a flow cross-section of a flow path formed such that it extends between a first one of the fluid connections and a second one of the fluid connections, wherein the controlling device for controlling the fluid mass flow has a receiving element for receiving the closure element, wherein a primary segment is arranged to be completely surrounded by the receiving element as a first section of the closure element, and a secondary segment is arranged to be completely surrounded by the housing as a second section of the closure element and the receiving element is arranged to be completely surrounded by the housing, wherein the secondary segment of the closure element is sealed to the housing via at least one first sealing element and the primary segment of the closure element is sealed to the receiving element via at least one second sealing element as well as the receiving element is sealed to the housing via at least one third sealing element, respectively in a fluid-tight and pressure-tight manner, wherein a third one of the fluid connections of the housing is formed to be acted upon by the fluid at the low pressure level.

2. The controlling device according to claim 1, wherein the closure element is formed integrally with the primary segment and the secondary segment.

3. The controlling device according to claim 1, wherein the at least one first sealing element, the at least one second sealing element, and the at least one third sealing element are each formed as an O-ring seal.

4. The controlling device according to claim 1, wherein the first one of the fluid connections of the housing is formed to be acted upon with the fluid at a counter pressure level and the second one of the fluid connections of the housing is formed to be acted upon with the fluid at the high pressure level.

5. The controlling device according to claim 1, wherein a fourth one of the fluid connections of the housing is formed to be acted upon by an ambient pressure level.

6. The controlling device according to claim 1, wherein the closure element is formed to be cylindrical with sections of different outer diameters.

7. The controlling device according to claim 6, wherein the closure element forms a sealing seat with the receiving element on a first end face.

8. The controlling device according to claim 6, wherein the primary segment of the closure element is formed with a primary segment diameter and the secondary segment of the closure element is formed with at least two sections with a respective different first outer diameter and a second outer diameter.

9. The controlling device according to claim 8, wherein a volume, which is delimited by the housing, the receiving element and the closure element with an annular effective surface with the first outer diameter of the closure element and the primary segment diameter of the closure element as an inner diameter, is acted upon by the fluid at the low pressure level and is formed to be connected to a third one of the fluid connections of the housing.

10. The controlling device according to claim 8, wherein a volume, which is delimited by the housing and the closure element with an annular effective surface with the first outer diameter of the closure element and the second outer diameter of the closure element as an inner diameter, is acted upon by the fluid at a counter pressure level and is formed to be connected to the first one of the fluid connections of the housing.

11. The compressing device for compressing the gaseous fluid from the low pressure level to the high pressure level, wherein the compressing device is a scroll compressor, having the housing with a counter wall and a compression mechanism with an immobile, fixed spiral and a movable, orbiting spiral driven via an eccentric drive, wherein the housing with the counter wall and the orbiting spiral are formed to enclose a counter pressure chamber at least in regions and a flow path extending from the high pressure region to the counter pressure chamber is formed, wherein the controlling device for controlling the fluid mass flow according to claim 1 is formed within the flow path extending between the high pressure region and the counter pressure chamber.

12. A use of the compressing device for compressing the gaseous fluid with the controlling device for controlling the fluid mass flow according to claim 11 in a refrigerant circuit of an air-conditioning system of a motor vehicle.

13. A controlling device for controlling a fluid mass flow for a compressing device for compressing a gaseous fluid from a low pressure level to a high pressure level, the controlling device comprising:

a housing with a plurality of fluid connections acted upon at different pressure levels and a closure element which is arranged such that it can be moved in a translatory manner within the housing along a longitudinal axis, with effective surfaces assigned to the fluid connections, wherein the closure element is formed such as to regulate a flow cross-section of a flow path formed such that it extends between a first one of the fluid connections and a second one of the fluid connections, wherein the controlling device for controlling the fluid mass flow has a receiving element for receiving the closure element, wherein a primary segment is arranged to be completely surrounded by the receiving element as a first section of the closure element, and a secondary segment is arranged to be completely surrounded by the housing as a second section of the closure element and the receiving element is arranged to be completely surrounded by the housing, wherein the secondary segment of the closure element is sealed to the housing via at least one first sealing element and the primary segment of the closure element is sealed to the receiving element via at least one second sealing element as well as the receiving element is sealed to the housing via at least one third sealing element, respectively in a fluid-tight and pressure-tight manner, wherein a volume delimited by the housing and a second end face of the closure element which is distal to the first end face is acted upon by an ambient pressure level and is formed to be connected to an environment via a fourth one of the fluid connections of the housing.

14. A controlling device for controlling a fluid mass flow for a compressing device for compressing a gaseous fluid from a low pressure level to a high pressure level, the controlling device comprising:

a housing with a plurality of fluid connections acted upon at different pressure levels and a closure element which is arranged such that it can be moved in a translatory manner within the housing along a longitudinal axis, with effective surfaces assigned to the fluid connections, wherein the closure element is formed such as to regulate a flow cross-section of a flow path formed such that it extends between a first one of the fluid connections and a second one of the fluid connections, wherein the controlling device for controlling the fluid mass flow has a receiving element for receiving the closure element, wherein a primary segment is arranged to be completely surrounded by the receiving element as a first section of the closure element, and a secondary segment is arranged to be completely surrounded by the housing as a second section of the closure element and the receiving element is arranged to be completely surrounded by the housing, wherein the secondary segment of the closure element is sealed to the housing via at least one first sealing element and the primary segment of the closure element is sealed to the receiving element via at least one second sealing element as well as the receiving element is sealed to the housing via at least one third sealing element, respectively in a fluid-tight and pressure-tight manner, wherein a first fluid connection is formed, which extends from the first one of the fluid connections to the volume delimited by the housing and the closure element with the annular effective surface with the first outer diameter of the closure element and the second outer diameter of the closure element as the inner diameter.

15. The controlling device according to of claim 14, wherein a second fluid connection is formed, which extends from the first one of the fluid connections to the volume delimited by the housing and the closure element with the annular effective surface with the first outer diameter of the closure element and the primary segment diameter of the closure element as an inner diameter.

16. The controlling device according to claim 15, wherein an expansion element is arranged within the second fluid connection.

* * * * *